(12) United States Patent
Schmitz et al.

(10) Patent No.: US 11,845,367 B2
(45) Date of Patent: Dec. 19, 2023

(54) RECLINER HEART HAVING LUBRICANT MEMBER

(71) Applicant: FISHER & COMPANY, INCORPORATED, St. Clair Shores, MI (US)

(72) Inventors: Ralph L. Schmitz, Clinton Township, MI (US); Sapan M. Poptani, Northville, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 125 days.

(21) Appl. No.: 16/842,135

(22) Filed: Apr. 7, 2020

(65) Prior Publication Data
US 2020/0331367 A1 Oct. 22, 2020

Related U.S. Application Data

(60) Provisional application No. 62/835,736, filed on Apr. 18, 2019.

(51) Int. Cl.
*B60N 2/22* (2006.01)
*B60N 2/225* (2006.01)

(52) U.S. Cl.
CPC ......... *B60N 2/2213* (2013.01); *B60N 2/2254* (2013.01)

(58) Field of Classification Search
CPC .................................................. B60N 2/2213
USPC ......................................................... 297/362
See application file for complete search history.

(56) References Cited

U.S. PATENT DOCUMENTS

| 3,736,026 A | 5/1973 | Ziegler et al. |
| 3,953,069 A | 4/1976 | Tamura et al. |
| 4,219,234 A | 8/1980 | Bell |
| 4,243,264 A | 1/1981 | Bell |
| 4,279,442 A | 7/1981 | Bell |
| 4,372,610 A | 2/1983 | Fisher, III et al. |
| 4,457,557 A | 7/1984 | Une |

(Continued)

FOREIGN PATENT DOCUMENTS

| CA | 2759299 A1 | 12/2011 |
| CA | 2869816 A1 | 10/2013 |

(Continued)

OTHER PUBLICATIONS

Office Action regarding Chinese Patent Application No. 201910334168.9, dated Apr. 30, 2021. Translation provided by Unitalen Attorneys at Law.

(Continued)

*Primary Examiner* — David R Dunn
*Assistant Examiner* — Tania Abraham
(74) *Attorney, Agent, or Firm* — Harness, Dickey & Pierce, P.L.C.

(57) ABSTRACT

A recliner heart may include a first locking plate, a second locking plate, a cam and a lubricant member. The first locking plate includes an outer diametrical surface having first teeth formed thereon. The second locking plate is rotatable relative to the first locking plate and includes an inner diametrical surface having second teeth formed thereon. Some of the second teeth are meshingly engaged with some of the first teeth. The cam is connected to the second locking plate and includes a groove formed therein. The lubricant member is disposed in the groove of the cam.

20 Claims, 11 Drawing Sheets

(56) References Cited

U.S. PATENT DOCUMENTS

| | | |
|---|---|---|
| 4,484,779 A | 11/1984 | Suzuki |
| 4,579,387 A | 4/1986 | Bell |
| 4,634,182 A | 1/1987 | Tanaka |
| 4,684,174 A | 8/1987 | Bell |
| 4,705,319 A | 11/1987 | Bell |
| 4,720,145 A | 1/1988 | Bell |
| 4,733,912 A | 3/1988 | Secord |
| 4,747,641 A | 5/1988 | Bell |
| 4,795,213 A | 1/1989 | Bell |
| 4,822,100 A | 4/1989 | Bell |
| 4,919,482 A | 4/1990 | Landis et al. |
| 4,928,374 A | 5/1990 | Allen |
| 5,007,680 A | 4/1991 | Miyauchi et al. |
| 5,044,647 A | 9/1991 | Patterson |
| 5,154,476 A | 10/1992 | Haider et al. |
| 5,240,309 A | 8/1993 | Kojer |
| 5,248,184 A | 9/1993 | Morris |
| 5,265,937 A | 11/1993 | Allen |
| 5,393,116 A | 2/1995 | Bolsworth et al. |
| 5,419,616 A | 5/1995 | Paetzold |
| 5,435,624 A | 7/1995 | Bray et al. |
| 5,460,429 A | 10/1995 | Whalen |
| 5,489,141 A | 2/1996 | Strausbaugh et al. |
| 5,577,805 A | 11/1996 | Glinter et al. |
| 5,590,932 A | 1/1997 | Olivieri |
| 5,622,410 A | 4/1997 | Robinson |
| 5,628,215 A | 5/1997 | Brown |
| 5,660,440 A | 8/1997 | Pejathaya |
| 5,718,481 A | 2/1998 | Robinson |
| 5,769,493 A | 6/1998 | Pejathaya |
| 5,788,330 A | 8/1998 | Ryan |
| 5,813,724 A | 9/1998 | Matsuura et al. |
| 5,823,622 A | 10/1998 | Fisher, IV et al. |
| 5,857,659 A | 1/1999 | Kato et al. |
| 5,918,939 A | 7/1999 | Magadanz |
| 5,927,809 A | 7/1999 | Tame |
| 5,941,591 A | 8/1999 | Tsuge et al. |
| 5,947,560 A | 9/1999 | Chen |
| 5,979,986 A | 11/1999 | Pejathaya |
| 6,007,152 A | 12/1999 | Kojima et al. |
| 6,023,994 A | 2/2000 | Yoshida |
| 6,047,444 A | 4/2000 | Braun |
| 6,068,341 A | 5/2000 | Rink |
| 6,074,009 A | 6/2000 | Farino |
| 6,095,609 A | 8/2000 | Magadanz |
| 6,106,067 A | 8/2000 | Zhuang et al. |
| 6,123,380 A | 9/2000 | Sturt et al. |
| 6,139,104 A | 10/2000 | Brewer |
| 6,158,800 A | 12/2000 | Tsuge et al. |
| 6,161,899 A | 12/2000 | Yu |
| 6,199,953 B1 | 3/2001 | Chen |
| 6,250,704 B1 | 6/2001 | Garrido |
| 6,290,297 B1 | 9/2001 | Yu |
| 6,328,381 B1 | 12/2001 | Smuk |
| 6,345,867 B1 | 2/2002 | Hellrung et al. |
| 6,447,066 B1 | 9/2002 | Chabanne et al. |
| 6,511,129 B1 | 1/2003 | Minor et al. |
| 6,533,357 B2 | 3/2003 | Pospeshil et al. |
| 6,550,864 B1 | 4/2003 | Zarna et al. |
| 6,554,362 B1 | 4/2003 | Pospeshil |
| 6,634,713 B2 | 10/2003 | Nonomiya et al. |
| 6,669,296 B2 | 12/2003 | Moriyama et al. |
| 6,669,299 B2 | 12/2003 | Carlson et al. |
| 6,698,837 B2 | 3/2004 | Pejathaya et al. |
| 6,709,053 B1 | 3/2004 | Humer et al. |
| 6,740,845 B2 | 5/2004 | Stol et al. |
| 6,758,525 B2 | 7/2004 | Uramichi |
| 6,854,802 B2 | 2/2005 | Matsuura et al. |
| 6,857,703 B2 | 2/2005 | Bonk |
| 6,860,562 B2 | 3/2005 | Bonk |
| 6,869,143 B2 | 3/2005 | Secord |
| 6,908,156 B1 | 6/2005 | Park et al. |
| 7,025,422 B2 | 4/2006 | Fast |
| 7,093,901 B2 | 8/2006 | Yamada |
| 7,097,253 B2 | 8/2006 | Coughlin et al. |
| 7,100,987 B2 | 9/2006 | Volker et al. |
| 7,121,624 B2 | 10/2006 | Pejathaya et al. |
| 7,152,924 B1 | 12/2006 | Nemoto et al. |
| 7,154,065 B2 | 12/2006 | Martukanitz et al. |
| 7,172,253 B2 | 2/2007 | Haverkamp |
| 7,198,330 B2 | 4/2007 | Wahlen et al. |
| 7,293,838 B2 | 11/2007 | Sugama et al. |
| 7,296,857 B2 | 11/2007 | Shinozaki et al. |
| 7,300,109 B2 | 11/2007 | Hofmann et al. |
| 7,306,286 B2 | 12/2007 | Syrowik et al. |
| 7,328,954 B2 | 2/2008 | Sasaki et al. |
| 7,360,838 B2 | 4/2008 | Smuk |
| 7,419,217 B2 | 9/2008 | Ishizuka |
| 7,458,639 B2 | 12/2008 | Thiel et al. |
| 7,490,907 B2 | 2/2009 | Nagura et al. |
| 7,500,719 B2 | 3/2009 | Kojima |
| 7,503,099 B2 | 3/2009 | Pejathaya |
| 7,527,336 B2 | 5/2009 | Kienke et al. |
| 7,578,556 B2 | 8/2009 | Ohba et al. |
| 7,604,297 B2 | 10/2009 | Weber |
| 7,695,068 B2 | 4/2010 | Maeda et al. |
| 7,775,591 B2 | 8/2010 | Hahn et al. |
| 7,775,594 B2 | 8/2010 | Bruck et al. |
| 7,976,103 B2 | 7/2011 | Gamache et al. |
| 8,052,215 B2 | 11/2011 | Ito |
| 8,128,169 B2 * | 3/2012 | Narita .................. B60N 2/0232 |
| | | 297/362 |
| 8,360,527 B2 | 1/2013 | Lehmann |
| 8,430,454 B2 | 4/2013 | Tanguy et al. |
| 8,449,034 B2 | 5/2013 | Tame et al. |
| 8,845,019 B2 | 9/2014 | Sawada |
| 8,985,690 B2 | 3/2015 | Yamada et al. |
| 9,102,248 B2 | 8/2015 | Matt |
| 9,108,541 B2 | 8/2015 | Assmann et al. |
| 9,221,364 B2 | 12/2015 | Nock et al. |
| 9,227,532 B2 | 1/2016 | Balzar et al. |
| 9,296,315 B2 | 3/2016 | Hellrung |
| 9,475,409 B2 * | 10/2016 | Jiang .................... B60N 2/2213 |
| 9,527,410 B2 | 12/2016 | Leconte |
| 9,527,419 B2 | 12/2016 | Hosbach et al. |
| 9,555,725 B2 | 1/2017 | Rothstein et al. |
| 9,573,493 B2 | 2/2017 | Nagura et al. |
| 9,616,779 B2 | 4/2017 | Barzen et al. |
| 9,623,774 B2 | 4/2017 | Yamada et al. |
| 9,701,222 B2 | 7/2017 | Kitou |
| 9,751,432 B2 | 9/2017 | Assmann |
| 9,873,357 B1 | 1/2018 | McCulloch et al. |
| 9,889,774 B2 | 2/2018 | Espinosa et al. |
| 10,065,538 B2 | 9/2018 | Desquesne et al. |
| 10,150,387 B2 | 12/2018 | Hiemstra et al. |
| 10,279,709 B2 | 5/2019 | Suzuki et al. |
| 10,399,466 B2 * | 9/2019 | Chang .................. B60N 2/2252 |
| 10,610,018 B1 | 4/2020 | Madhu |
| 10,787,098 B2 | 9/2020 | Smuk |
| 10,800,296 B2 | 10/2020 | Schmitz et al. |
| 10,864,830 B2 | 12/2020 | Schmitz et al. |
| 11,052,797 B2 | 7/2021 | Poptani et al. |
| 2002/0043852 A1 | 4/2002 | Uramichi |
| 2003/0127898 A1 | 7/2003 | Niimi et al. |
| 2003/0178879 A1 | 9/2003 | Uramichi |
| 2003/0230923 A1 | 12/2003 | Uramichi |
| 2004/0134055 A1 | 7/2004 | Aizaki |
| 2004/0145226 A1 | 7/2004 | Bonk |
| 2004/0195889 A1 | 10/2004 | Secord |
| 2005/0029806 A1 | 2/2005 | Yamanashi et al. |
| 2005/0253439 A1 | 11/2005 | Sasaki et al. |
| 2006/0006718 A1 | 1/2006 | Umezaki |
| 2006/0012232 A1 | 1/2006 | Coughlin et al. |
| 2006/0055223 A1 | 3/2006 | Thiel et al. |
| 2006/0170269 A1 | 8/2006 | Oki |
| 2007/0138854 A1 | 6/2007 | Paing et al. |
| 2007/0145800 A1 | 6/2007 | Thiel et al. |
| 2007/0200408 A1 | 8/2007 | Ohta et al. |
| 2008/0001458 A1 | 1/2008 | Hoshihara et al. |
| 2008/0164741 A1 | 7/2008 | Sakamoto |
| 2009/0001797 A1 | 1/2009 | Neumann |
| 2009/0056124 A1 | 3/2009 | Krebs et al. |
| 2009/0072602 A1 | 3/2009 | Schuler |
| 2010/0072802 A1 | 3/2010 | Smith et al. |

(56) References Cited

U.S. PATENT DOCUMENTS

| | | |
|---|---|---|
| 2010/0096892 A1 | 4/2010 | Meghira et al. |
| 2010/0096896 A1 | 4/2010 | Nonomiya |
| 2010/0176621 A1 | 7/2010 | Aufrere et al. |
| 2010/0231021 A1 | 9/2010 | Myers et al. |
| 2010/0283304 A1 | 11/2010 | Thiel |
| 2010/0308634 A1 | 12/2010 | Narita et al. |
| 2010/0308635 A1 | 12/2010 | Tame et al. |
| 2010/0320823 A1 | 12/2010 | Thiel |
| 2011/0068612 A1 | 3/2011 | Thiel |
| 2011/0127814 A1 | 6/2011 | Thiel |
| 2011/0169314 A1 | 7/2011 | Tanguy et al. |
| 2011/0227386 A1 | 9/2011 | Berndtson et al. |
| 2011/0309665 A1 | 12/2011 | Leighton et al. |
| 2012/0086253 A1 | 4/2012 | Nock et al. |
| 2012/0169102 A1 | 7/2012 | Hiemstra et al. |
| 2012/0248841 A1 | 10/2012 | Hellrung et al. |
| 2012/0313415 A1 | 12/2012 | Nonomiya et al. |
| 2013/0161995 A1 | 6/2013 | Yamada et al. |
| 2013/0207434 A1 | 8/2013 | Stilleke et al. |
| 2013/0270884 A1 | 10/2013 | Espinosa et al. |
| 2014/0001806 A1 | 1/2014 | Golarz |
| 2014/0008956 A1 | 1/2014 | Golarz et al. |
| 2014/0008958 A1 | 1/2014 | Ito |
| 2014/0091607 A1 | 4/2014 | Maeda |
| 2014/0138998 A1 | 5/2014 | Christoffel et al. |
| 2014/0159458 A1 | 6/2014 | Lu et al. |
| 2014/0225411 A1 | 8/2014 | Matt |
| 2014/0239691 A1 | 8/2014 | Hellrung |
| 2014/0239693 A1* | 8/2014 | Nock ............... B23K 26/28 219/121.64 |
| 2014/0301682 A1 | 10/2014 | Leppla |
| 2015/0015044 A1 | 1/2015 | Teufel et al. |
| 2015/0042133 A1 | 2/2015 | Munemura et al. |
| 2015/0069809 A1 | 3/2015 | Matt |
| 2015/0091346 A1 | 4/2015 | Kitou |
| 2015/0091354 A1 | 4/2015 | Enokijima et al. |
| 2015/0123444 A1 | 5/2015 | Assmann |
| 2015/0266398 A1 | 9/2015 | Higashi et al. |
| 2015/0306986 A1 | 10/2015 | Jarry et al. |
| 2015/0321585 A1 | 11/2015 | McCulloch et al. |
| 2016/0023577 A1 | 1/2016 | Yamada et al. |
| 2016/0107546 A1 | 4/2016 | Barzen et al. |
| 2016/0272089 A1 | 9/2016 | Kim et al. |
| 2016/0339810 A1 | 11/2016 | Pluta et al. |
| 2017/0021743 A1 | 1/2017 | Hiemstra et al. |
| 2017/0037945 A1 | 2/2017 | Maeda et al. |
| 2017/0080828 A1 | 3/2017 | Aktas |
| 2017/0088021 A1 | 3/2017 | Noguchi et al. |
| 2017/0136921 A1 | 5/2017 | Dill et al. |
| 2017/0253152 A1 | 9/2017 | Maeda et al. |
| 2018/0043800 A1 | 2/2018 | Maeda et al. |
| 2018/0056819 A1 | 3/2018 | Schmitz et al. |
| 2018/0103760 A1 | 4/2018 | Fujita et al. |
| 2018/0154802 A1 | 6/2018 | Ito |
| 2018/0208087 A1 | 7/2018 | Baba et al. |
| 2018/0339613 A1 | 11/2018 | Mizobata |
| 2019/0255979 A1 | 8/2019 | Zahn et al. |
| 2019/0299821 A1 | 10/2019 | Maeda et al. |
| 2019/0329674 A1 | 10/2019 | Schmitz et al. |
| 2019/0337424 A1 | 11/2019 | Chang |
| 2019/0353694 A1 | 11/2019 | Yamakita |
| 2020/0047644 A1 | 2/2020 | Schmitz et al. |
| 2020/0070689 A1 | 3/2020 | Naik et al. |
| 2020/0164775 A1 | 5/2020 | Chang |
| 2020/0253380 A1 | 8/2020 | Schmitz et al. |
| 2020/0282879 A1 | 9/2020 | Schmitz et al. |
| 2021/0039528 A1 | 2/2021 | Poptani et al. |
| 2021/0061139 A1 | 3/2021 | Schmitz et al. |

FOREIGN PATENT DOCUMENTS

| | | |
|---|---|---|
| CN | 1291566 A | 4/2001 |
| CN | 1457306 A | 11/2003 |
| CN | 1840382 A | 10/2006 |
| CN | 101148152 A | 3/2008 |
| CN | 101616820 A | 12/2009 |
| CN | 101925485 A | 12/2010 |
| CN | 102126451 A | 7/2011 |
| CN | 102131673 A | 7/2011 |
| CN | 202086037 U | 12/2011 |
| CN | 102442228 A | 5/2012 |
| CN | 103025568 A | 4/2013 |
| CN | 103298685 A | 9/2013 |
| CN | 203228664 U | 10/2013 |
| CN | 203381519 U | 1/2014 |
| CN | 103702860 A | 4/2014 |
| CN | 103857314 A | 6/2014 |
| CN | 203974603 U | 12/2014 |
| CN | 105189196 A | 12/2015 |
| CN | 205097989 U | 3/2016 |
| CN | 205130981 U | 4/2016 |
| CN | 106799978 A | 6/2017 |
| CN | 107364369 A | 11/2017 |
| CN | 107428269 A | 12/2017 |
| CN | 107972542 A | 5/2018 |
| CN | 207291755 U | 5/2018 |
| CN | 108263253 A | 7/2018 |
| CN | 109515263 A | 3/2019 |
| CN | 109562707 A | 4/2019 |
| CN | 112339625 A | 2/2021 |
| DE | 907608 C | 3/1954 |
| DE | 1098292 B | 1/1961 |
| DE | 4324734 A1 | 1/1995 |
| DE | 20220200 U1 | 2/2004 |
| DE | 102007002366 B3 | 7/2008 |
| DE | 102008026176 A1 | 12/2009 |
| DE | 102008029438 A1 | 12/2009 |
| DE | 102010038795 A1 | 2/2012 |
| DE | 102011013163 A1 | 9/2012 |
| DE | 102012009159 A1 | 11/2012 |
| DE | 102011108976 A1 | 1/2013 |
| DE | 102012008940 A1 | 11/2013 |
| DE | 112014000343 T5 | 9/2015 |
| DE | 102017100374 A1 | 7/2017 |
| DE | 202018107311 U1 | 2/2019 |
| EP | 1074426 A2 | 2/2001 |
| GA | 2369034 A1 | 7/2002 |
| GB | 1136097 A | 12/1968 |
| GB | 1546104 A | 5/1979 |
| GB | 2441871 A | 3/2008 |
| JP | 2000084684 A | 3/2000 |
| JP | 2000153327 A | 6/2000 |
| JP | 2001186957 A | 7/2001 |
| JP | 2002119349 A | 4/2002 |
| JP | 5290789 B2 | 9/2013 |
| JP | 5555969 B2 | 7/2014 |
| KR | 20030092869 A | 12/2003 |
| KR | 100601809 B1 | 7/2006 |
| KR | 20070119332 A | 12/2007 |
| KR | 100817000 B1 | 3/2008 |
| KR | 20090035633 A | 4/2009 |
| KR | 20140001651 A | 1/2014 |
| KR | 101420164 B1 | 7/2014 |
| KR | 101655777 B1 | 9/2016 |
| WO | WO-9620848 A1 | 7/1996 |
| WO | 2006069630 A2 | 7/2006 |
| WO | WO-2011069107 A2 | 6/2011 |
| WO | 2013133245 A1 | 9/2013 |
| WO | 2013152433 A1 | 10/2013 |
| WO | WO-2013167240 A1 | 11/2013 |
| WO | 2015012287 A1 | 1/2015 |
| WO | 2016115986 A1 | 7/2016 |
| WO | 2017118496 A1 | 7/2017 |
| WO | 2021020580 A1 | 2/2021 |

OTHER PUBLICATIONS

SPI Lasers UK Ltd., "Opening new possibilities with single mode oscillation welding (CW)." Presented at: Laser World of Photonics China; Shanghai, China (Mar. 2008).

(56) References Cited

OTHER PUBLICATIONS

Office Action regarding German Patent Application No. 102019211855. 0, dated Feb. 4, 2021. Partial translation provided by Bardehle Pagenberg Partnerschaft mbB.
Office Action regarding Canadian Patent Application No. 2,812,408, dated Jun. 17, 2016.
Office Action regarding German Patent Application No. 102016114406. 1, dated Apr. 27, 2020. Translation provided by Witte, Weller & Partner Patentanwalte mbB.
International Search Report regarding International Application No. PCT/US2020/021377, dated Jun. 30, 2020.
Written Opinion of the International Searching Authority regarding International Application No. PCT/US2020/021377, dated Jun. 30, 2020.
Office Action regarding German Patent Application No. 102019212517. 4, dated Mar. 11, 2021. Partial translation provided by Bardehle Pagenberg Partnerschaft mbB.
Office Action regarding Indian Patent Application No. 201921032346, dated Mar. 18, 2021.
Notice of Allowance regarding U.S. Appl. No. 16/996,991, dated Oct. 4, 2021.
Office Action regarding U.S. Appl. No. 16/542,369, dated Jul. 16, 2021.
Office Action regarding U.S. Appl. No. 16/542,369, dated May 17, 2021.
Notice of Allowance regarding U.S. Appl. No. 16/542,369, dated Oct. 10, 2021.
Office Action regarding U.S. Appl. No. 16/740,874, dated Apr. 26, 2021.
Office Action regarding U.S. Appl. No. 16/740,874, dated Aug. 16, 2021.
Office Action regarding U.S. Appl. No. 16/811,112, dated Sep. 3, 2021.
Office Action regarding German Application No. 102019110151.4, dated Jul. 12, 2021.
Office Action regarding German Patent Application No. 102020200559. 1, dated Jul. 23, 2021.
Office Action regarding Chinese Patent Application No. 201910725351. 1, dated Jul. 5, 2021.
Office Action regarding U.S. Appl. No. 16/740,874, dated Oct. 20, 2021.
Office Action regarding German Patent Application No. 10 2019 211 855.0, dated Nov. 25, 2021.
Office Action regarding Chinese Patent Application No. 2021120202214440, dated Dec. 7, 2021.
Office Action regarding Chinese Patent Application No. 201910801476. 8, dated Dec. 17, 2021.
Office Action regarding Chinese Patent Application No. 202010305091. 5, dated Jan. 27, 2022. Translation provided by Unitalen Attorneys at Law.
Office Action regarding German Patent Application No. 102013103671. 6, dated May 20, 2021. Translation provided by Witte, Weller & Partner Patentanwälte mbB.
First Chinese Office Action regarding Application No. 201910801476.8 dated Aug. 10, 2021. English translation provided by Unitalen Attorneys at Law.
Office Action regarding German Patent Application 10 2020 204 814.2 dated Jun. 8, 2022.
Office Action regarding Chinese Patent Application No. 2020103050915, dated Jun. 23, 2022.
Office Action regarding Chinese Patent Application No. 020107827129, dated Jun. 1, 2022.
Office Action regarding U.S. Appl. No. 17/720,609 dated May 17, 2023.
German Office Action regarding Patent Application No. 102022201243. 7, dated May 12, 2023.

* cited by examiner

RECLINER HEART HAVING LUBRICANT MEMBER

CROSS-REFERENCE TO RELATED APPLICATIONS

This application claims the benefit of U.S. Provisional Application No. 62/835,736, filed on Apr. 18, 2019. The entire disclosure of the above application is incorporated herein by reference.

FIELD

The present disclosure relates to a recliner heart having a lubricant member.

BACKGROUND

This section provides background information related to the present disclosure and is not necessarily prior art.

Vehicle seats often include a recliner heart that can selectively rotate a seatback relative to a seat bottom. Lubricant may be applied to the recliner heart to reduce wear of internal components. Lubricant applied to internal components of a conventional recliner heart may break down due to tolerances between components, forces acting on the components and surface finishes of the components, for example, which may decrease the reliability and effectiveness of the recliner heart. The present disclosure provides a recliner heart that lubricates the internal components of the recliner heart despite lubricant breaking down, which increases the reliability of the recliner heart.

SUMMARY

This section provides a general summary of the disclosure, and is not a comprehensive disclosure of its full scope or all of its features.

In one form, the present disclosure provides a recliner heart that includes a first locking plate, a second locking plate, a cam and a first lubricant member. The first locking plate includes an outer diametrical surface having first teeth formed thereon. The second locking plate is rotatable relative to the first locking plate and includes a first inner diametrical surface having second teeth formed thereon. Some of the second teeth are meshingly engaged with some of the first teeth. The cam is connected to the second locking plate and includes a first groove formed therein. The first lubricant member is disposed in the first groove of the cam.

In some configurations of the recliner heart of the above paragraph, the second locking plate includes a plate body, a hub and a rim. The cam is disposed over the hub and the rim includes the first inner diametrical surface having the second teeth formed thereon.

In some configurations of the recliner heart of any one or more of the above paragraphs, the cam includes a body defining an aperture and an attachment portion. The first groove is formed in the attachment portion.

In some configurations of the recliner heart of any one or more of the above paragraphs, a second inner diametrical surface of the body includes second grooves formed therein. The second lubricant members are disposed within respective second grooves and contact the hub.

In some configurations of the recliner heart of any one or more of the above paragraphs, the cam is configured to rotate relative to the hub so that the second lubricant members lubricates the hub.

In some configurations of the recliner heart of any one or more of the above paragraphs, a bushing ring is disposed between the cam and the first locking plate. The cam is configured to rotate relative to the bushing ring so that the first lubricant member lubricates the bushing ring.

In some configurations of the recliner heart of any one or more of the above paragraphs, the first lubricant member is substantially cylindrically shaped and includes a flat surface that contacts the bushing ring.

In some configurations of the recliner heart of any one or more of the above paragraphs, the attachment portion of the cam includes a second groove formed therein. A second lubricant member is disposed within the second groove and contacts the bushing ring.

In some configurations of the recliner heart of any one or more of the above paragraphs, the first and second lubricant members and the bushing ring cooperate to form a pocket. Lubricant in the pocket lubricates the bushing ring when the cam rotates relative to the bushing ring.

In some configurations of the recliner heart of any one or more of the above paragraphs, the first and second lubricant members are made of a resiliently compressible material.

In some configurations of the recliner heart of any one or more of the above paragraphs, the first lubricant member is made of a felt material.

In some configurations of the recliner heart of any one or more of the above paragraphs, the first lubricant member is saturated with lubricant.

In another form, the present disclosures provides a recliner heart that includes a first locking plate, a second locking plate, a first hub, a cam, a first wedge and a first lubricant member. The first locking plate includes an outer diametrical surface having first teeth formed thereon. The second locking plate rotatable relative to the first locking plate and includes a first inner diametrical surface having second teeth formed thereon. Some of the second teeth are meshingly engaged with some of the first teeth. The first hub extends through the first and second locking plates and is configured to rotate. The cam is rotationally fixed to the first hub. The first wedge is rotationally fixed to the hub and includes a first groove formed therein. The first lubricant member is disposed in the first groove of the first wedge.

In some configurations of the recliner heart of the above paragraph, wherein the second locking plate includes a plate body, a second hub and a rim. The cam is disposed over the second hub and the rim includes the first inner diametrical surface having the second teeth formed thereon.

In some configurations of the recliner heart of any one or more of the above paragraphs, a bushing ring is disposed between the cam and the first locking plate. The hub, the cam and the wedge are configured to rotate relative to the bushing ring so that the first lubricant member lubricates the bushing ring.

In some configurations of the recliner heart of any one or more of the above paragraphs, the first wedge is disposed between the cam and the bushing ring and includes a second groove formed therein. A second lubricant member is disposed in the second groove.

In some configurations of the recliner heart of any one or more of the above paragraphs, a second wedge is disposed between the cam and the bushing ring and is rotationally fixed to the hub. The second wedge includes a second groove formed therein.

In some configurations of the recliner heart of any one or more of the above paragraphs, a second lubricant member is disposed in the second groove. The second lubricant member contacts the bushing ring.

In some configurations of the recliner heart of any one or more of the above paragraphs, the cam includes a body defining an aperture and a distal portion. The first and second wedges are positioned at opposite sides of the distal portion.

In some configurations of the recliner heart of any one or more of the above paragraphs, the first and second lubricant members are made of a felt material.

In some configurations of the recliner heart of any one or more of the above paragraphs, the first and second lubricant members are saturated with lubricant.

In yet another form, the present disclosure provides a recliner heart that includes a first locking plate, a second locking plate, a cam and a bushing ring. The first locking plate includes an outer diametrical surface having first teeth formed thereon. The second locking plate is rotatable relative to the first locking plate and includes a first inner diametrical surface having second teeth formed thereon. Some of the second teeth are meshingly engaged with some of the first teeth. The cam is connected to the second locking plate. The bushing ring is disposed between the cam and the first locking plate. The cam and the bushing ring cooperate to form a pocket that moves as the cam rotates relative to the bushing ring.

In some configurations of the recliner heart of the above paragraph, a plurality of lubricant members are attached to the cam. The cam, two of the plurality of lubricant members and the bushing ring cooperate to form the pocket.

In some configurations of the recliner heart of any one or more of the above paragraphs, the plurality of lubricant members are made of a resiliently compressible material.

In some configurations of the recliner heart of any one or more of the above paragraphs, the pocket contains lubricant therein that lubricates the bushing ring as the cam rotates.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
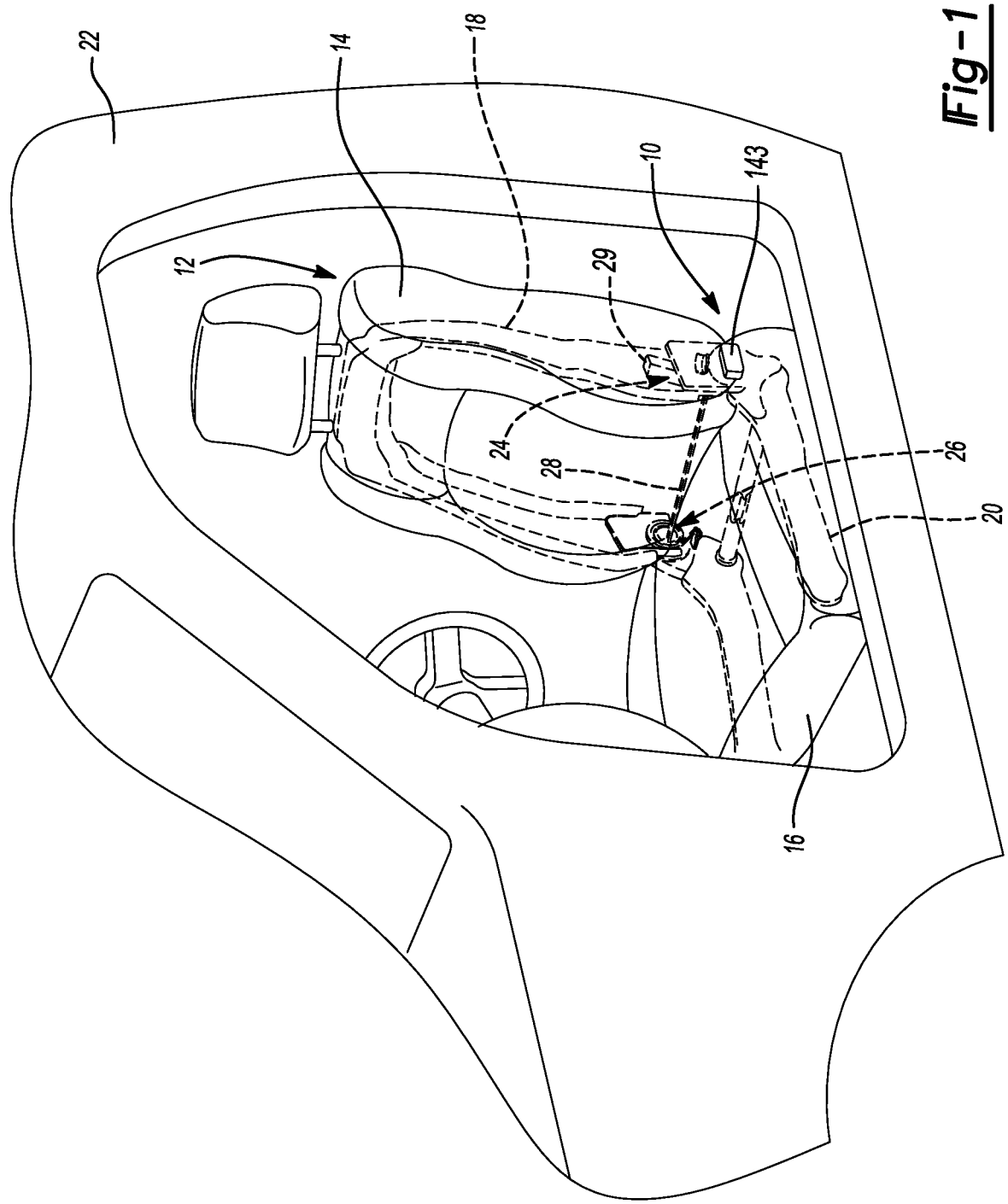
FIG. 1 is a partial perspective view of a vehicle having a seat incorporating a recliner assembly according to the principles of the present disclosure.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
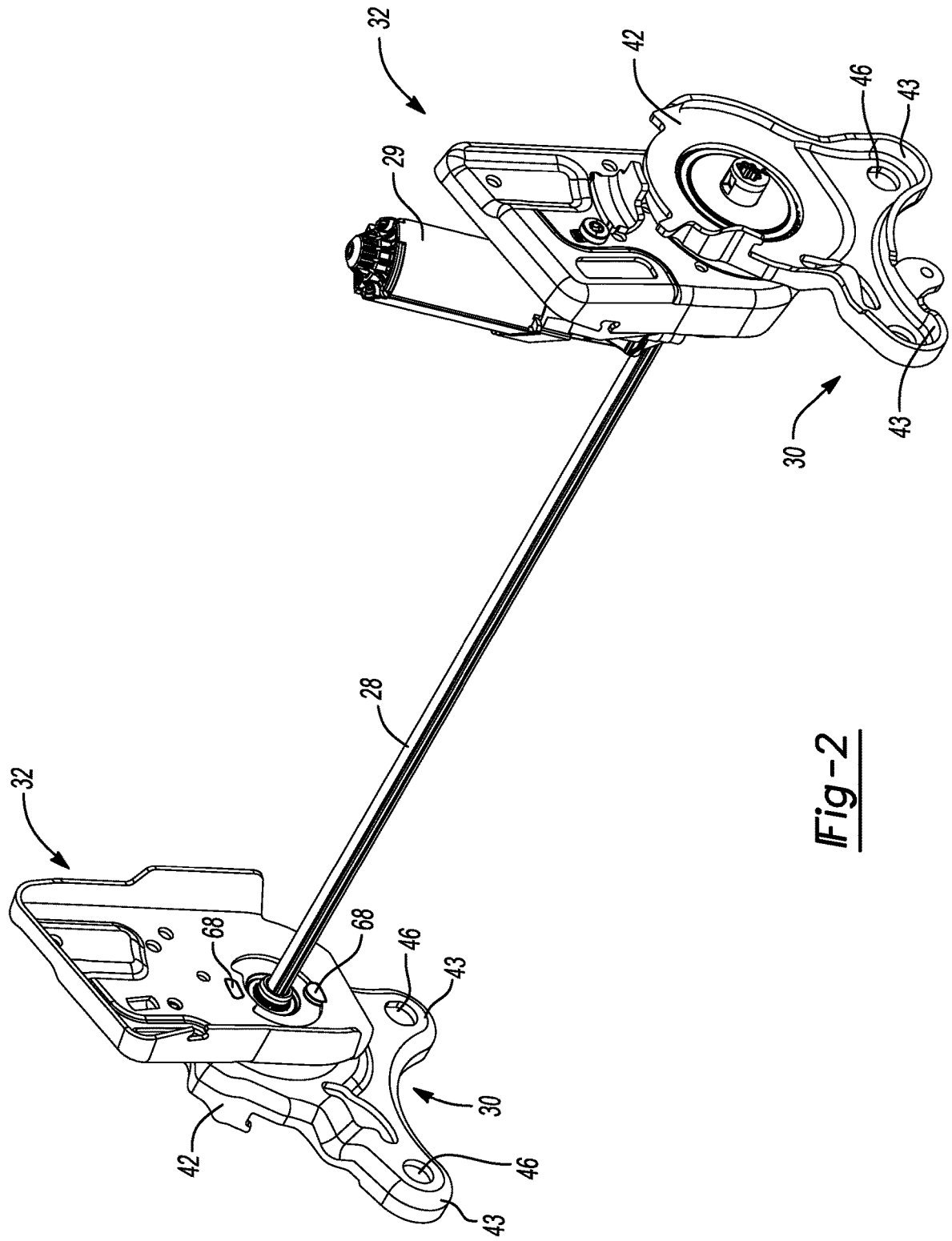
FIG. 2 is a perspective view of the recliner assembly of FIG. 1.

With reference to FIGS. 1 and 2, a recliner assembly 10 is provided that may be incorporated into a vehicle seat assembly 12 having a seatback 14 and a seat bottom 16. The seatback 14 and seat bottom 16 may include a seatback frame 18 and a seat bottom frame 20, respectively. The seat assembly 12 may be positioned in a vehicle 22, as shown in FIG. 1. The recliner assembly 10 may include a first recliner mechanism 24, a second recliner mechanism 26, a cross member 28, and a motor 29.

Figure 3:
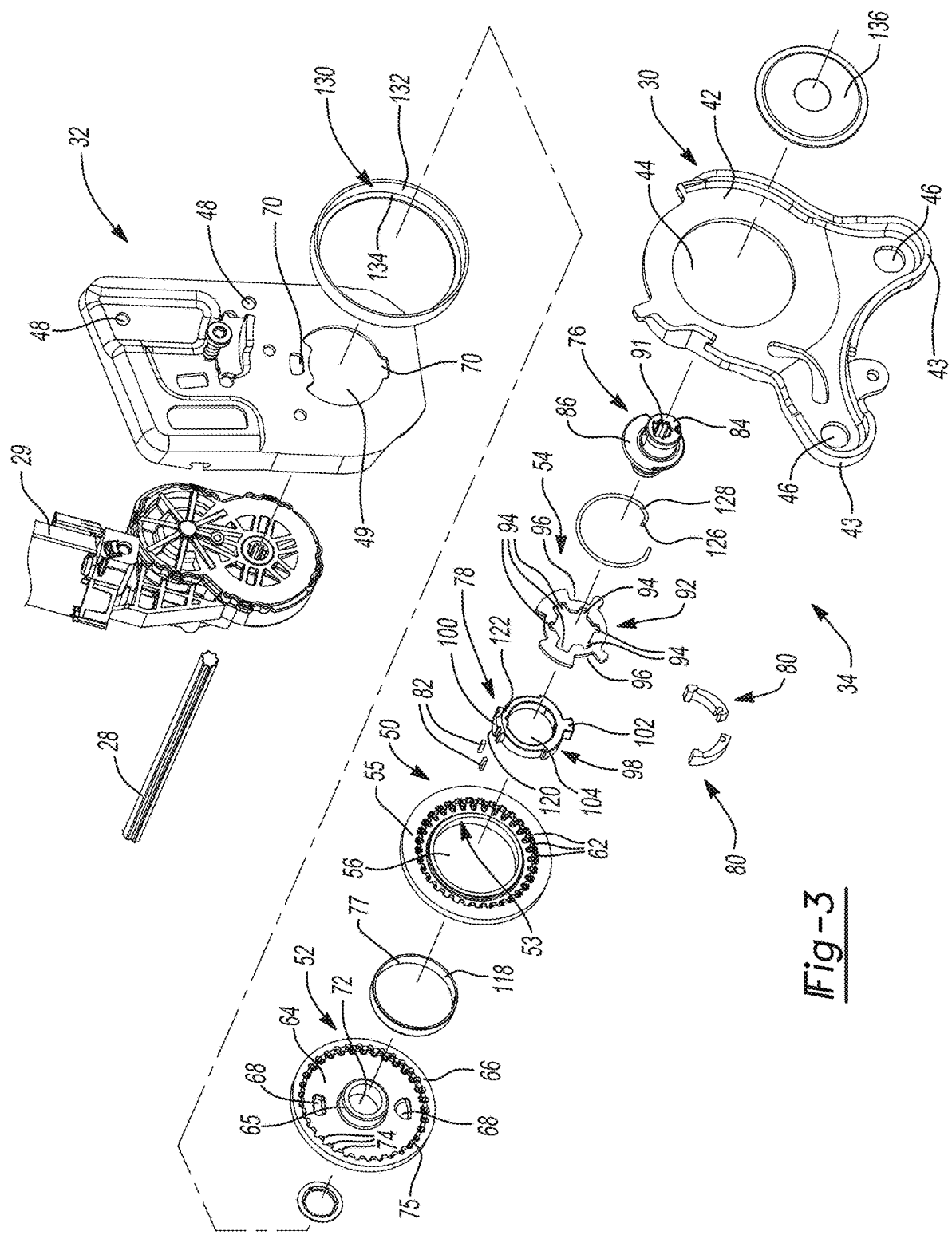
FIG. 3 is an exploded view of a portion of the recliner assembly of FIG. 1.
Figure 4:
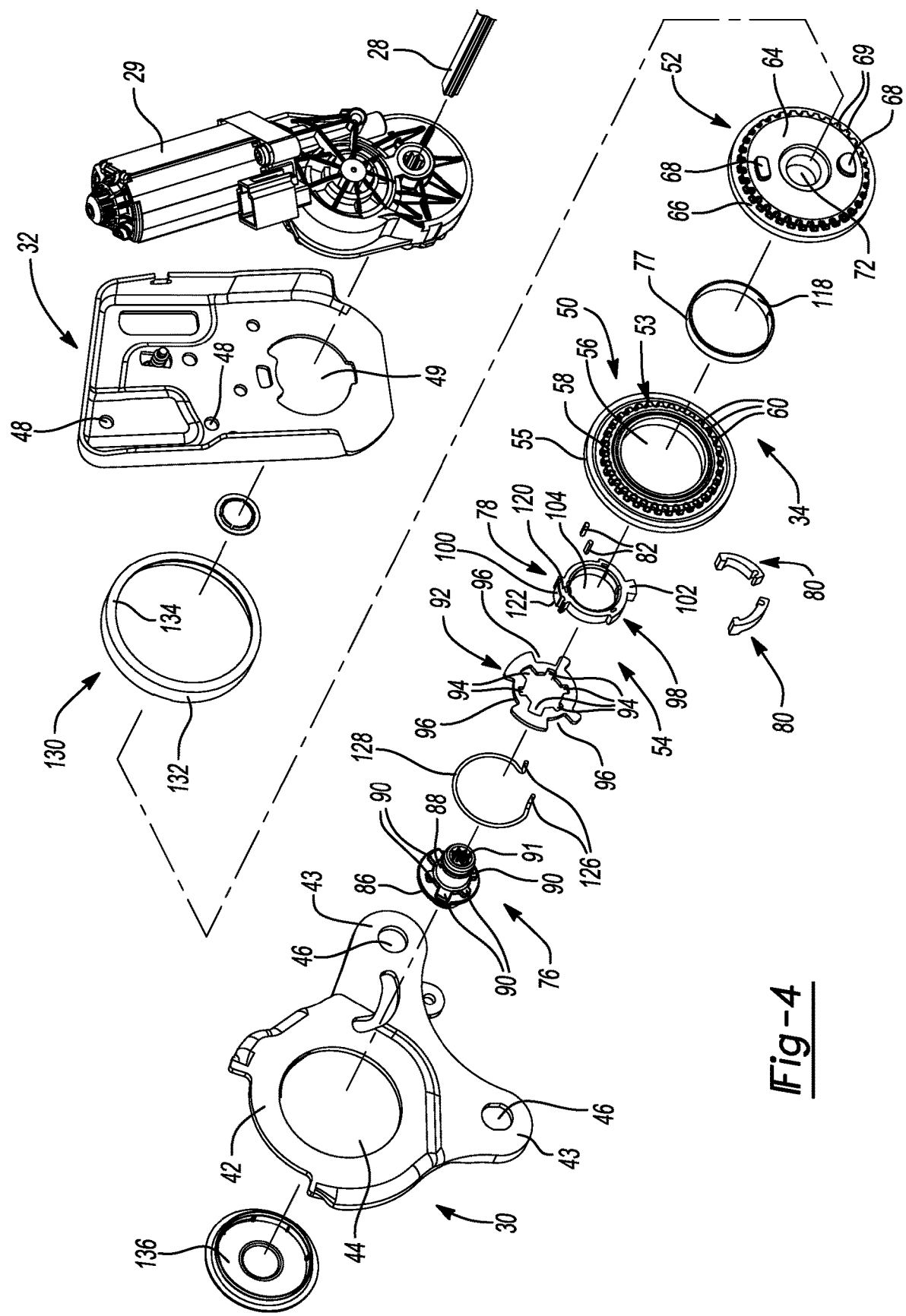
FIG. 4 is another exploded view of a portion of the recliner assembly of FIG. 1.

The first and second recliner mechanisms 24, 26 may be operable in a locked state preventing relative rotation between the seatback 14 and the seat bottom 16 and an unlocked state permitting relative rotation between the seatback 14 and the seat bottom 16 among an upright position (FIG. 1), a rearward reclined position (not shown) and a forward dump position (not shown). As shown in FIGS. 3 and 4, the first recliner mechanism 24 may include a first bracket 30, a second bracket 32 and a recliner heart (or locking mechanism) 34.

As shown in FIGS. 2-4, the first bracket 30 may include a generally round main body 42 and a pair of mounting lobes 43 that extend outward from the main body 42. The main body 42 may define a central aperture 44. The mounting lobes 43 may include a plurality of apertures 46 through which fasteners (not shown) may extend to securely attach the first bracket 30 to the seat bottom frame 20 of the seat assembly 12.

As shown in FIGS. 3 and 4, the second bracket 32 may be generally rectangular and may include a plurality of apertures 48, and a central aperture 49 through which the cross member 28 extends. Fasteners (not shown) may extend through the plurality of apertures 48 to securely attach the second bracket 32 to the seatback frame 18 of the seat assembly 12.

The recliner heart 34 may be mounted to the first and second brackets 30, 32 and may selectively permit relative rotation between the seatback 14 and the seat bottom 16. The recliner heart 34 may be a round recliner heart, for example, or any other suitable type of recliner heart. As shown in FIGS. 3 and 4, the recliner heart 34 may include a first locking plate 50, a second locking plate 52 and a locking assembly 54.

Figure 5:
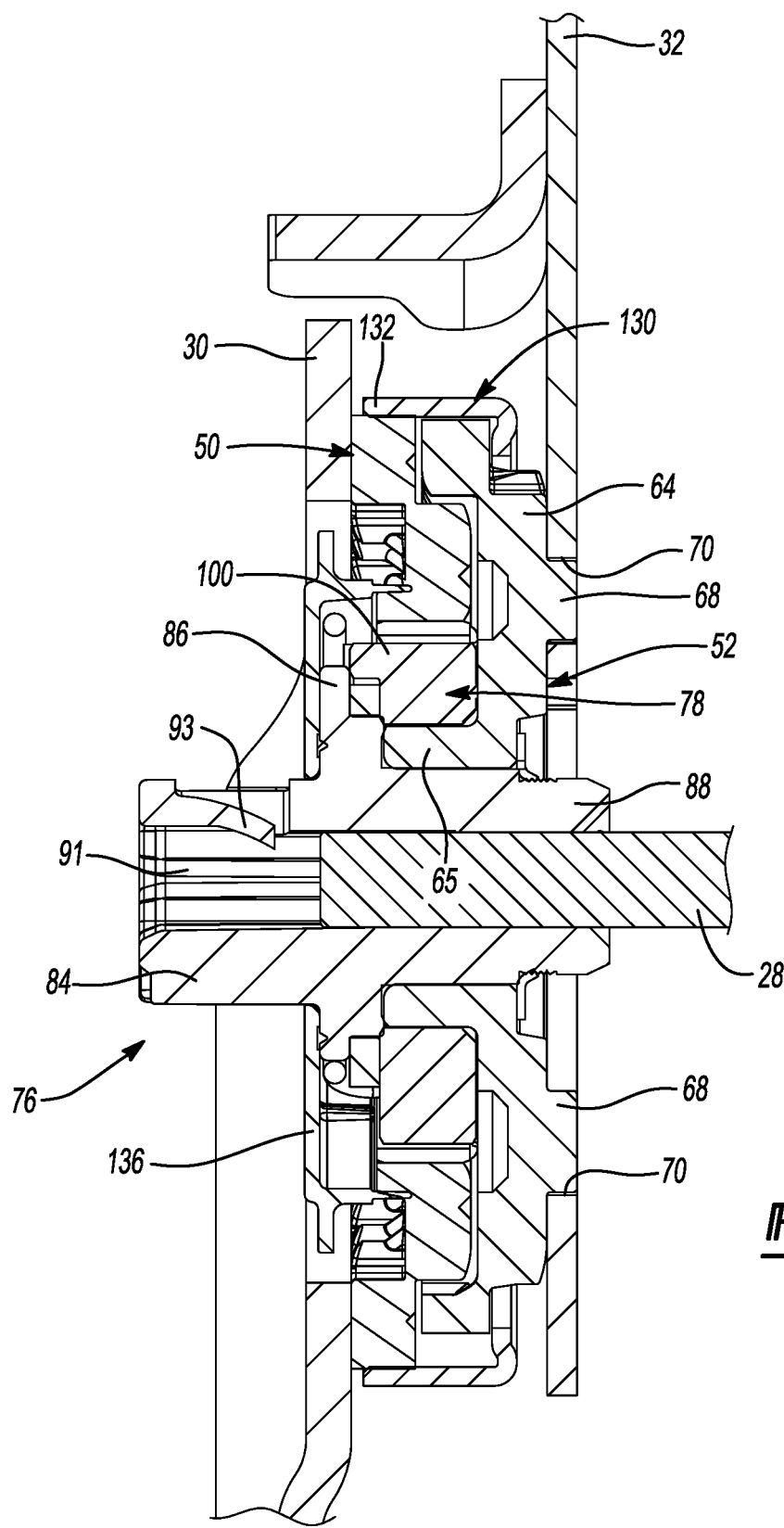
FIG. 5 is a cross-sectional view of a recliner mechanism of the recliner assembly of FIG. 1.

With reference to FIGS. 3-5, the first locking plate 50 may be rotationally fixed to the first bracket 30 (FIG. 5) and may be generally a circular shape (FIGS. 3 and 4). As shown in FIGS. 3 and 4, the first locking plate 50 may include an inner section 53 and a rim or outer section 55. The inner section 53 may define an opening 56 and may include an outer diametrical surface 58 having teeth 60 thereon. The rim 55 may be rotationally fixed to the first bracket 30 and may extend 360 degrees around a periphery of the inner section 53. The rim 55 may include an inner diametrical surface having teeth 62 thereon.

With reference to FIGS. 3-5, the second locking plate 52 may be generally a circular shape (FIGS. 3 and 4) and may include a plate body 64, a hub 65 and a rim 66. The plate body 64 may include projections 68 and teeth 69. The projections 68 may extend from a surface of the plate body 64 and may be received in respective openings 70 of the second bracket 32, thereby rotationally fixing the second locking plate 52 and the seatback 14. As shown in FIG. 4, the teeth 69 may extend 360 degrees around an outer diametrical surface of the plate body 64. The hub 65 may extend from a center portion of the plate body 64 in a direction opposite of the projections 68 and may define an opening 72 extending therethrough. The rim 66 may extend 360 degrees around a periphery of the plate body 64 and may include teeth 74 (FIGS. 3, 6 and 8) that extends 360 degrees around an inner diametrical surface 75 of the rim 66.

As shown in FIGS. 3 and 4, the locking assembly 54 may include a hub 76, a bushing ring 77, a cam 78, wedges 80 and lubricant members 82. The hub 76 may include a hub portion 84, a flange portion 86 and a shaft portion 88. The shaft portion 88 may extend axially from one side of the flange portion 86 and the hub portion 84 may extend axially from the other side of the flange portion 86. The shaft portion 88 may extend through the cam 78, the bushing ring 77, the opening 56 of the first locking plate 50 and the opening 72 of the hub 65 of the second locking plate 52. The shaft portion 88 may include a plurality of radially extending protrusions 90. The cross member 28 may be received in an aperture 91 of the hub 76 such that hub 76 is drivingly engaged thereto. In this way, rotation of the cross member 28 causes corresponding rotation of the hub 76. As shown in FIG. 5, a stop member 93 of the hub portion 84 may extend into the aperture 91 to prevent the cross member 28 from extending out of the hub 76.

As shown in FIGS. 3 and 4, a transfer plate 92 may be disposed between the flange portion 86 and the cam 78, and may include a plurality of first rectangular-shaped slots 94 and a plurality of second rectangular-shaped slots 96. Each protrusion 90 may be received in a respective first slot 94, thereby rotationally fixing the transfer plate 92 to the hub 76. The bushing ring 77 may be pressed-fitted into the opening 56 of the first locking plate 50 and between the inner section 53 of the first locking plate 50 and the cam 78.

With reference to FIGS. 3-6 and 8, the cam 78 may be disposed over the hub 65 of the second locking plate 52 (FIGS. 5, 6 and 8) and may include a body 98, an attachment portion 100 and a distal portion 102. The body 98 may be circular in shape and may define an aperture 104 that receives the hub 65 of the second locking plate 52. The body 98 may have a first portion 106 and a second portion 108. The first portion 106 may have a thickness that is greater than a thickness of the second portion 108 of the body 98. Grooves 110 may be formed in an inner diametrical surface 112 of the body 98.

As shown in FIGS. 3, 4 and 6-9, the attachment portion 100 may be rectangular-shaped and may be integral with an outer surface of the second portion 108 of the body 98. The attachment portion 100 may include an end that extends through one of the second slots 96 of the transfer plate 92 such that the cam 78 and the hub 76 are rotationally fixed to each other. A plurality of semi-circular shaped grooves or trenches 114 are formed in an arcuate surface 116 of the attachment portion 100 (i.e., the plurality of grooves 114 are formed in the surface 116 that faces an inside surface 118 of the bushing ring 77). As shown in FIGS. 3 and 4, each groove 114 may extend a width of the surface 116 (i.e., each groove 114 may extend from one lateral side 120 of the attachment portion 100 to the other lateral side 122 of the attachment portion 100). The distal portion 102 may be integral with an outer surface of the first portion 106 such that it is 180 degrees opposite the attachment portion 100.

Figure 6:
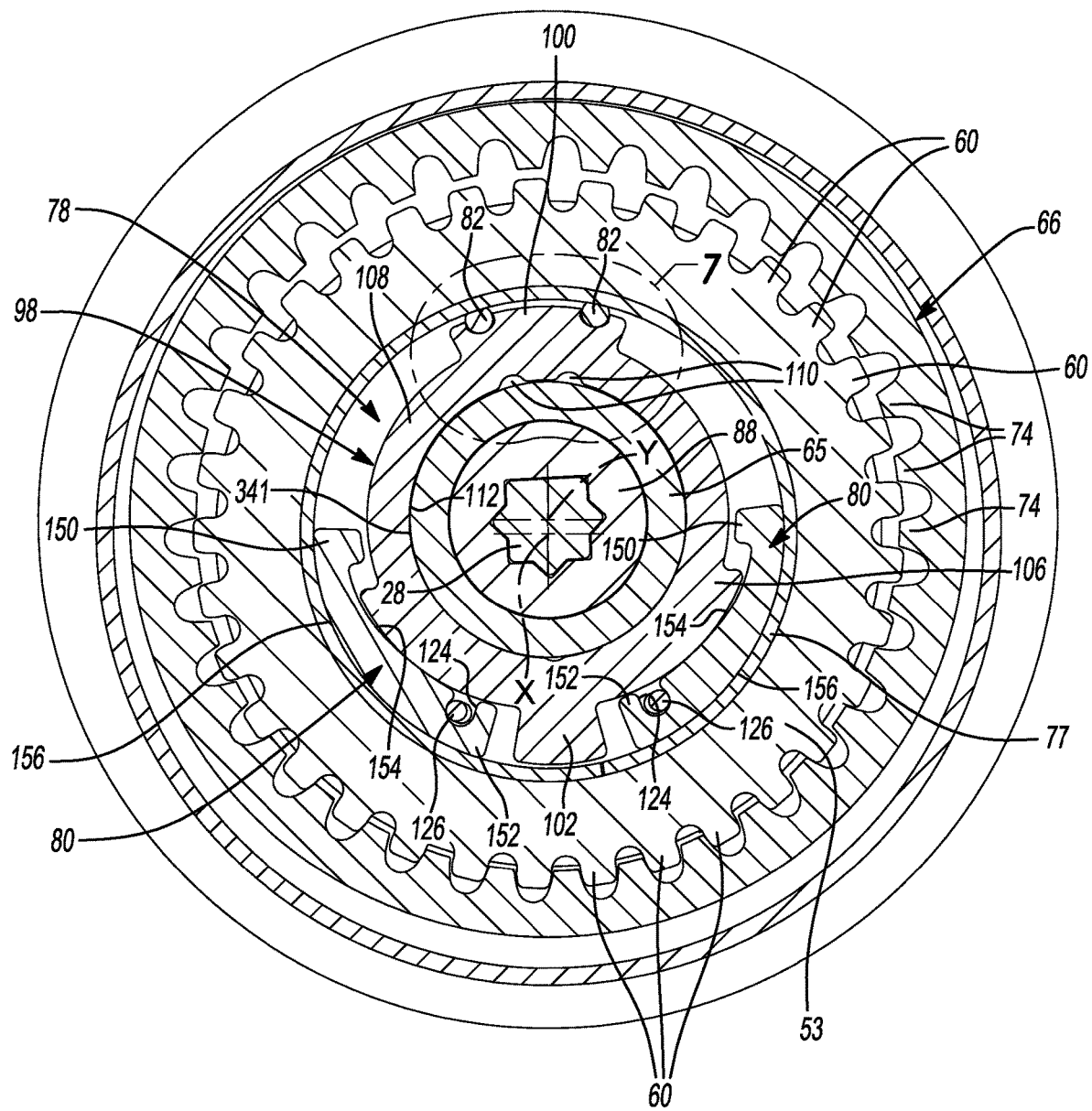
FIG. 6 is a cross-sectional view of the recliner mechanism of the recliner assembly of FIG. 1 in a first position.
Figure 7:
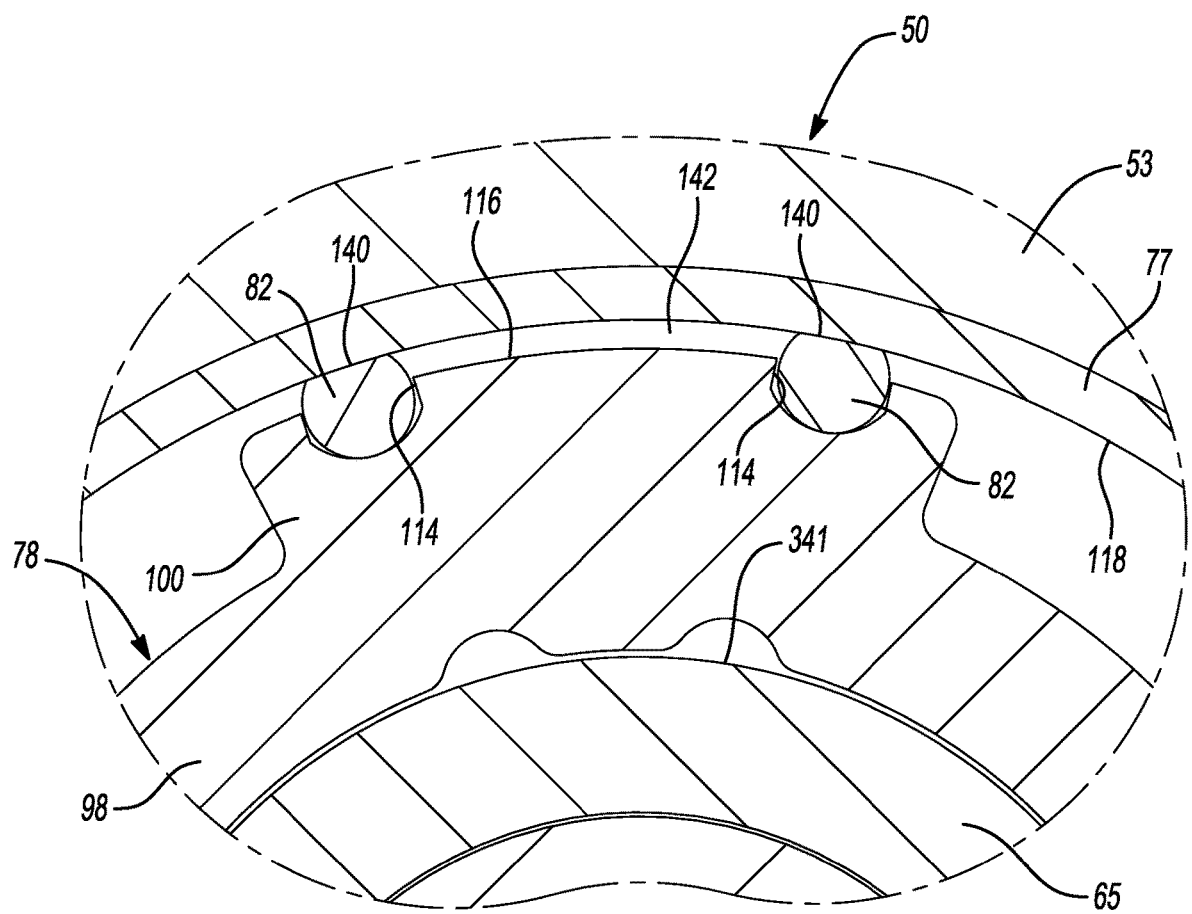
FIG. 7 is a close-up view of a portion of the recliner mechanism indicated as area 7 in FIG. 6.
Figure 8:
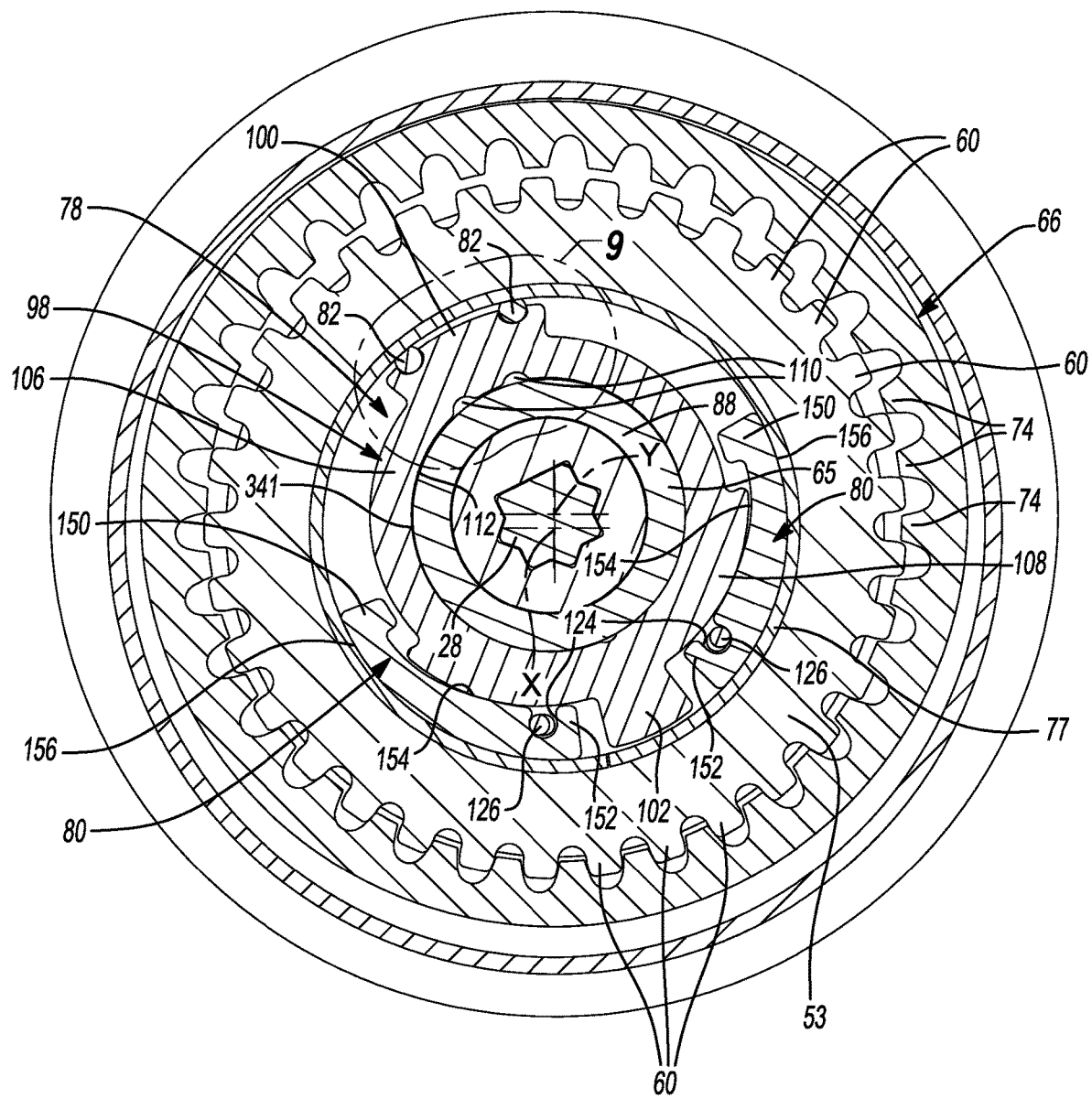
FIG. 8 is a cross-sectional view of the recliner mechanism of the recliner assembly of FIG. 1 in a second position.
Figure 9:
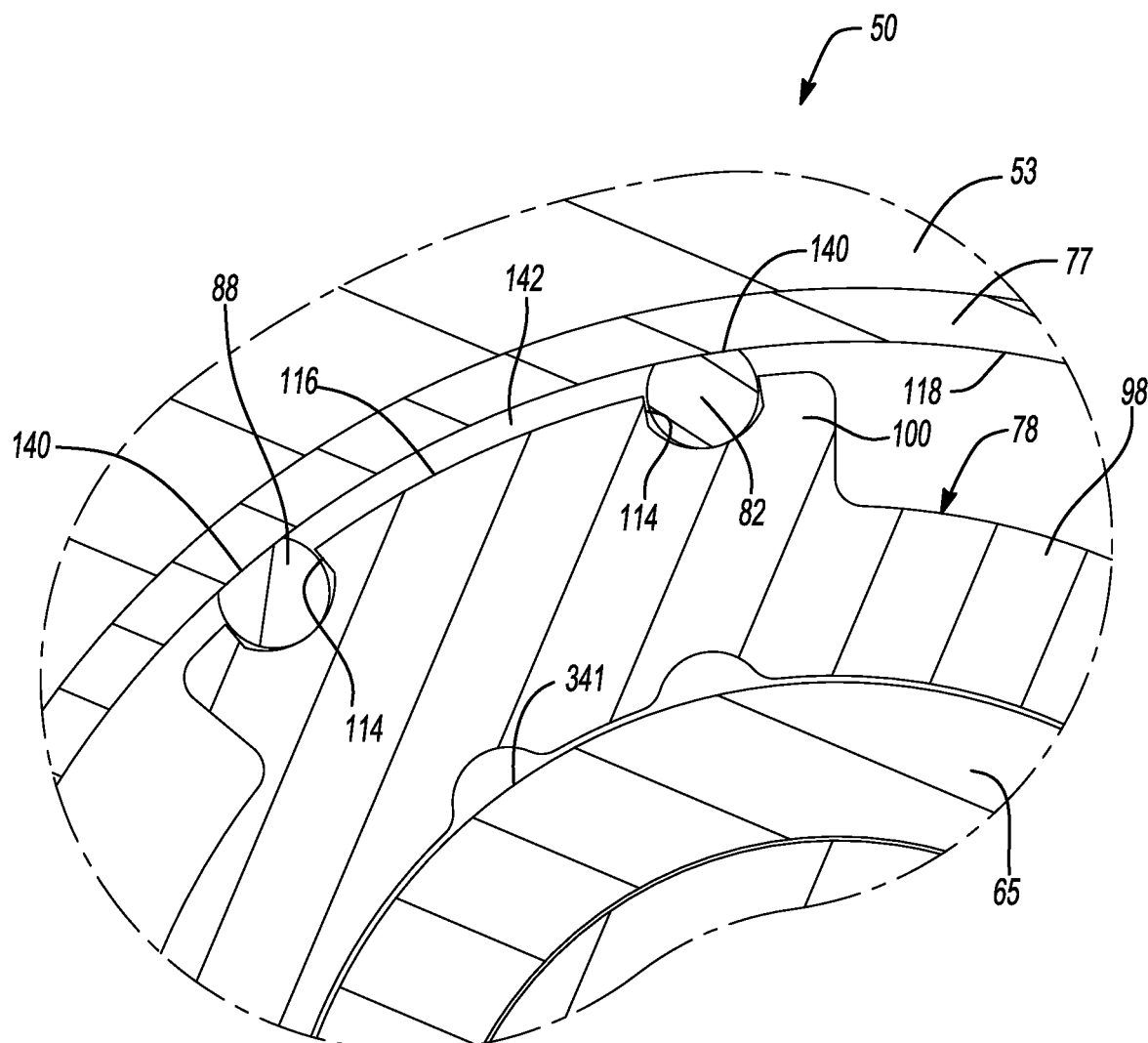
FIG. 9 is a close-up view of a portion of the recliner mechanism indicated as area 8 in FIG. 8.

As shown in FIGS. 6 and 8, the wedges 80 are disposed between the body 98 and the bushing ring 77. Each wedge 80 has a first end 150 and a second end 152. The first end 150 extends into a respective second slot 96 of the transfer plate 92. Each wedge 80 increases in thickness from the first end 150 toward the second end 152. Each wedge 80 also has a groove 124 at or near the second end 152 that receives a respective end 126 of a spring 128 such that the spring 128 forces the wedges 80 outwardly and away from the distal portion 102. Each wedge 80 also has a curved inner surface 154 and a curved outer surface 156. The inner surface 154 may contact a surface 157 of the first portion 106 of the body 98 and the outer surface 156 may contact the inside surface 118 of the bushing ring 77. The wedges 80 are wedged between the first portion 106 of the body 98 and the bushing ring 77 and rotation of the transfer plate 92 and the cam 78 causes rotation of the wedges 80. In some configurations, the distal portion 102 may contact one of the wedges 80 as the cam rotates 78, which, in turn, causes both wedges 80 to rotate with the cam 78.

An encapsulating ring 130 may include a body 132 and a lip 134 that extends radially inwardly from an axial end of the body 132. As shown in FIG. 5, the body 132 may be attached (e.g., by laser welding) to the first locking plate 50 to hold the recliner heart 34 together and also to cover a periphery of the recliner heart 34, thereby preventing debris and fluid from infiltrating and damaging the recliner heart 34. As shown in FIG. 5, a circular-shaped cap 136 may be attached (e.g., laser welding) to the flange portion 86 and may cover the recliner heart 34, thereby preventing debris and fluid from infiltrating and damaging the recliner heart 34.

As shown in FIGS. 6-9, each lubricant member 82 may be disposed in a respective groove 114 of the attachment portion 100. Each lubricant member 82 may be a generally cylindrical or spherical shape and may be made of a fibrous material (e.g., felt material), for example, or any other absorbent material. In some configurations, each lubricant member 82 may be made of a resiliently compressible material (e.g., rubber) or a porous polymeric material. Each lubricant member 82 may be saturated with lubricant (e.g., oil) and may have a flat surface 140. The flat surface 140 may contact the inside surface 118 of the bushing ring 77. Two of the lubricant members 82 and the bushing ring 77 may cooperate to define a lubricant pocket 142 that may also include lubricant contained therein.

The structure and function of the second recliner mechanism 26 may be similar or identical to that of the first recliner mechanism 24, and therefore, will not be described again in detail.

With reference to FIGS. 1-9, operation of the recliner assembly 10 will be described in detail. When a user (not shown) actuates an actuation switch 143 (shown schematically in FIG. 1) that is associated with the seat assembly 12, the motor 29 drives the cross member 28. This causes the hub 76, the transfer plate 92, the cam 78 and the wedges 80 to rotate relative to the first locking plate 50 and the bushing ring 77. Rotation of the hub 76, the transfer plate 92, the cam 78 and the wedges 80 causes rotation of the second locking plate 52 relative to the first locking plate 50 and the bushing ring 77. That is, a center point X of the second locking plate 52 and a center point Y of the first locking plate 50 are offset such that rotation of the hub 76, the transfer plate 92, the cam 78 and the wedges 80 causes the second locking plate 52 to rotate about the center point Y of the first locking plate 50. In this way, a portion of the teeth 74 of the second locking plate 52 are meshingly engaged with a portion of the teeth 60 of the first locking plate 50 at different points in the rotational path as the second locking plate 52 rotates about the first locking plate 50 (i.e., all the teeth 74 of the second locking plate 52 are never meshingly engaged with all the teeth 60 of the first locking plate 50), thereby rotating the seatback 14 in the rearward direction (or forward direction).

With reference to FIGS. 6 and 8, as the cam 78 rotates, the lubricant members 82 and lubricant contained in the pocket 142 lubricate the inside surface 118 of the bushing ring 77. It should be understood that the lubricant members 82 may be disposed between movable and non-movable components of the recliner assembly 10, thereby lubricating surfaces of such components as the recliner assembly 10 operates.

One of the benefits of the recliner assembly 10 of the present disclosure is that the lubricant members 82 and lubricant contained in the pocket 142 lubricate internal components of the recliner heart 34, thereby increasing cycle durability of the recliner assembly 10. That is, lubricant applied to components of the recliner heart 34 during assembly may break down due to tolerances between components, forces acting on the components and surface finishes of the components, for example. For example, the inside surface 118 of the bushing ring 77 may be TEFLON, and therefore, lubricant (e.g., grease) applied thereto during assembly may not stay on the inside surface 118 during operation of the recliner assembly 10. The lubricant members 82 and lubricant contained in the pocket 142 may lubricate the inside surface 118 of the bushing ring 77 as the cam 78 rotates to reduce wear of the bushing ring 77 and the cam 78, thereby increasing cycle durability of the recliner assembly 10. This also provides for more efficient and effective operation of the recliner assembly 10.

It should be understood that the lubricant members 82 may also absorb lubricant in areas having excessive lubricant, which can be used to lubricate areas having moderate or insufficient lubricant.

Figure 10:
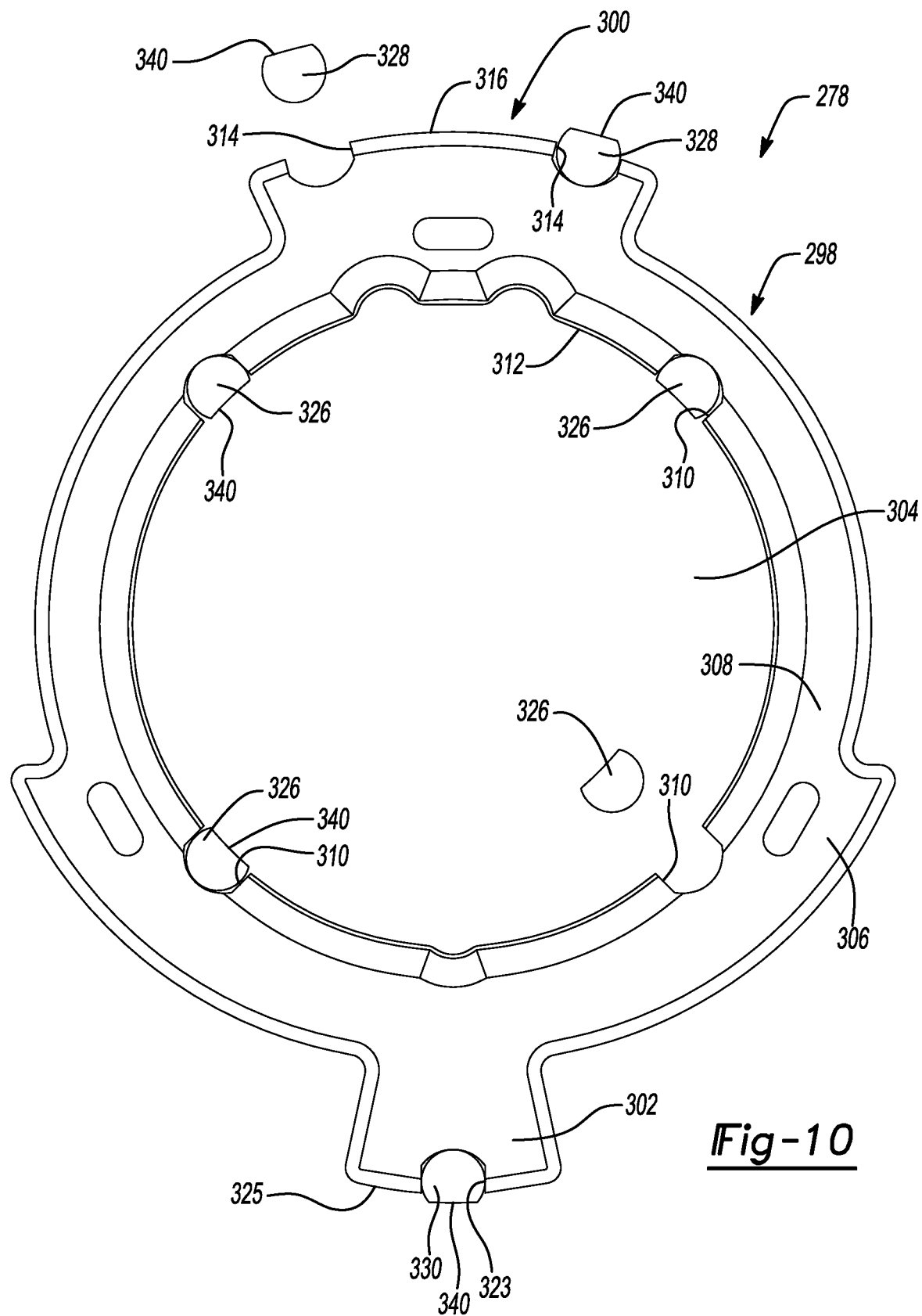
FIG. 10 is a front view of an alternate cam of the recliner mechanism.

With reference to FIG. 10, a cam 278 is provided. The cam 278 may be incorporated into the recliner heart 34 described above instead of the cam 78. The structure and function of the cam 278 may be similar or identical to that of the cam 78 described above, apart from any exceptions noted below.

The cam 278 may be disposed over the hub 65 of the second locking plate 52 and may include a body 298, an attachment portion 300 and a distal portion 302. The body 298 may be circular in shape and may define an aperture 304 that receives the hub 65 of the second locking plate 52. The body 298 may have a first portion 306 and a second portion 308. The first portion 306 may have a thickness that is greater than a thickness of the second portion 308 of the body 298. U-shaped grooves 310 may be formed in an inner diametrical surface 312 of the body 298.

The attachment portion 300 may be rectangular-shaped and may be integral with an outer surface of the second portion 308 of the body 298. The attachment portion 300 may include an end that extends through one of the second slots 96 of the transfer plate 92 such that the cam 278 and the hub 76 are rotationally fixed to each other. A plurality of semi-circular shaped grooves or trenches 314 are formed in an arcuate surface 316 of the attachment portion 300 (i.e., the plurality of grooves 314 are formed in the surface 316 that faces the inside surface 118 of the bushing ring 77). At least one U-shaped groove 323 may be formed in an arcuate surface 325 of the distal portion 302 (the groove 323 is formed in the surface 325 that faces the inside surface 118 of the bushing ring 77).

Each lubricant member 326 may be disposed in a respective groove 310 of the body 298, each lubricant member 328 may be disposed in a respective groove 314 of the attachment portion 300 and each lubricant member 330 may be disposed in a respective groove 323 of the distal portion 302. Each lubricant member 326, 328, 330 may be a generally cylindrical or spherical shape and may be made of a fibrous material (e.g., felt material), for example, or any other absorbent material. In some configurations, each lubricant member 326, 328, 330 may be made of a resiliently compressible material (e.g., rubber) or a porous polymeric material. Each lubricant member 326, 328, 330 may be saturated with lubricant (e.g., oil) and may have a flat surface 340. The flat surfaces 340 of the lubricant members 326 may contact an outer diametrical surface 341 of the hub 65 and the flat surfaces 140 of the lubricant members 328, 330 may contact the inside surface 118 of the bushing ring 77.

As the cam 278 rotates, the lubricant members 326 lubricate the outer diametrical surface 341 of the hub 65 and the lubricant members 328, 330 lubricate the inside surface 118 of the bushing ring 77. It should be understood that the lubricant members 328 and the bushing ring 77 cooperate to form a pocket (not shown) that also lubricates the inside surface 118 of the bushing ring 77 as the cam 278 rotates.

Figure 11:
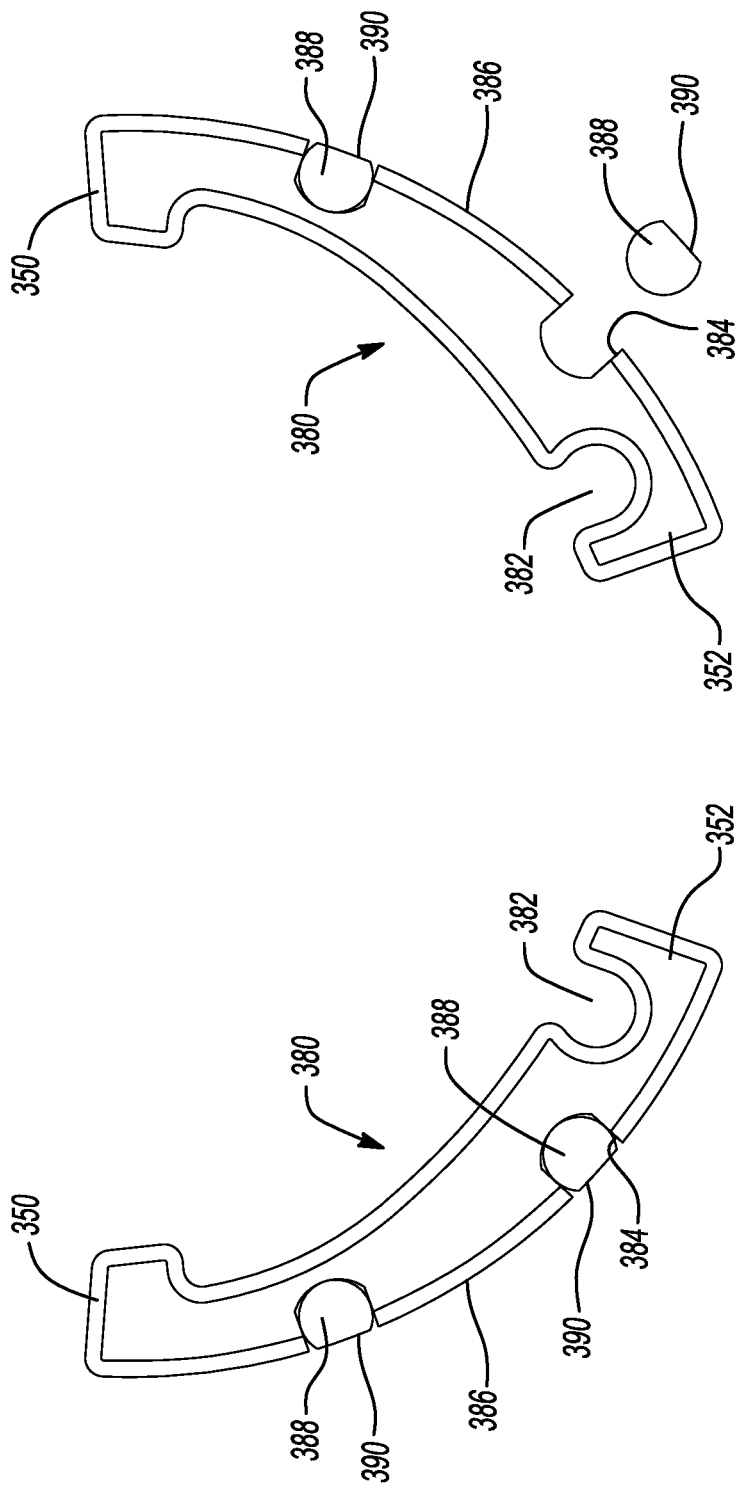
FIG. 11 is a front view of alternate wedges of the recliner mechanism.

With reference to FIG. 11, wedges 380 are provided. The wedges 380 may be incorporated into the recliner heart 34 described above instead of wedges 80. The structure and function of the wedges 380 may be similar or identical to that of the wedges 80 described above, apart from any exceptions noted below.

The wedges 380 may be disposed between the body 98 and the bushing ring 77. Each wedge 380 has a first end 350 and a second end 352. The first end 350 extends into a respective second slot 96 of the transfer plate 92. Each wedge 380 increases in thickness from the first end 350 toward the second end 352. Each wedge 380 also has a groove 382 at or near the second end 352 that receives a respective end 126 of the spring 128 such that the spring 128 forces the wedges 380 outwardly and away from the distal portion 102. The wedges 380 are wedged between the first portion 106 of the body 98 and the bushing ring 77 and rotation of the transfer plate 92 and the cam 78 causes rotation of the wedges 380.

A plurality of semi-circular shaped grooves or trenches 384 are formed in an arcuate surface 386 of the wedges 380 (i.e., the plurality of grooves 384 are formed in the surface 386 that faces the inside surface 118 of the bushing ring 77). A plurality of lubricant members 388 may be disposed in the grooves 384. Each lubricant member 388 may be a generally cylindrical or spherical shape and may be made of a fibrous material (e.g., felt material), for example, or any other absorbent material. In some configurations, each lubricant member 388 may be made of a resiliently compressible material (e.g., rubber) or a porous polymeric material. Each lubricant member 388 may be saturated with lubricant (e.g., oil) and may have a flat surface 390. The flat surface 390 may contact the inside surface 118 of the bushing ring 77. The lubricant members 388 may lubricate the inside surface 118 of the bushing ring 77 as the wedges 380 rotate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A recliner heart comprising:
   a first locking plate including an outer diametrical surface having first teeth formed thereon;
   a second locking plate rotatable relative to the first locking plate and including a first inner diametrical surface having second teeth formed thereon, some of the second teeth are meshingly engaged with some of the first teeth;
   a cam connected to the second locking plate and including a pair of first grooves formed therein; and
   a pair of first lubricant members disposed in the first grooves of the cam, wherein the first lubricant members are formed from a material selected from the group consisting of: a fibrous material and a porous polymeric material, wherein the first lubricant members, the cam and an inner section of the first locking plate cooperate to define a lubricant pocket and the lubricant pocket is enclosed between the pair of first lubricant members, the cam and the inner section of the first locking plate.

2. The recliner heart of claim 1, wherein the second locking plate includes a plate body, a hub and a rim, and wherein the cam is disposed over the hub and the rim includes the first inner diametrical surface having the second teeth formed thereon.

3. The recliner heart of claim 2, wherein the cam includes a body defining an aperture and an attachment portion, and wherein the first grooves are formed in the attachment portion.

4. The recliner heart of claim 3, wherein a second inner diametrical surface of the body includes second grooves formed therein, and wherein second lubricant members are disposed within respective second grooves and contact the hub.

5. The recliner heart of claim 4, wherein the cam is configured to rotate relative to the hub so that the second lubricant members lubricate the hub.

6. The recliner heart of claim 3, further comprising a bushing ring disposed between the cam and the first locking plate, and wherein the cam is configured to rotate relative to the bushing ring so that the first lubricant members lubricate the bushing ring.

7. The recliner heart of claim 6, wherein the first lubricant members are substantially cylindrically shaped and each of the first lubricant members includes a flat surface that contacts the bushing ring.

8. The recliner heart of claim 6, wherein first lubricant members contact the bushing ring, and wherein the first lubricant members and the bushing ring cooperate to form the lubricant pocket, and wherein lubricant in the lubricant pocket lubricates the bushing ring when the cam rotates relative to the bushing ring.

9. The recliner heart of claim 8, wherein the material of the first lubricant members is resiliently compressible.

10. The recliner heart of claim 1, wherein the material of the first lubricant members is a felt material that is saturated with lubricant.

11. A recliner heart comprising:
    a first locking plate including an outer diametrical surface having first teeth formed thereon;

a second locking plate rotatable relative to the first locking plate and including a first inner diametrical surface having second teeth formed thereon, some of the second teeth are meshingly engaged with some of the first teeth;

a first hub extending through the first and second locking plates and configured to rotate;

a cam rotationally fixed to the first hub;

a first wedge rotationally fixed to the first hub and including a pair of first grooves formed therein;

a pair of first lubricant members disposed in the first grooves of the first wedge;

a bushing ring disposed between the cam and the first locking plate, wherein the pair of first lubricant members, the first wedge and the bushing ring cooperate to define a lubricant pocket and the lubricant pocket is enclosed between the pair of first lubricant members, the first wedge and an inside surface of the bushing ring, wherein the first hub, the cam, and the first wedge are configured to rotate relative to the bushing ring so that the first lubricant members lubricate the bushing ring; and a second wedge disposed between the cam and the bushing ring and rotationally fixed to the first hub, wherein the second wedge includes a second groove formed therein.

12. The recliner heart of claim 11, wherein the second locking plate includes a plate body, a second hub and a rim, and wherein the cam is disposed over the second hub and the rim includes the first inner diametrical surface having the second teeth formed thereon.

13. The recliner heart of claim 12, wherein the first wedge is disposed between the cam and the bushing ring and includes a third groove formed therein, and wherein a second lubricant member is disposed in the third groove.

14. The recliner heart of claim 13, further comprising a third lubricant member disposed in the second groove, and wherein the third lubricant member contacts the bushing ring.

15. The recliner heart of claim 14, wherein the cam includes a body defining an aperture and a distal portion, and wherein the first and second wedges are positioned at opposites sides of the distal portion.

16. A recliner heart comprising:
a first locking plate including an outer diametrical surface having first teeth formed thereon;
a second locking plate rotatable relative to the first locking plate and including a first inner diametrical surface having second teeth formed thereon, some of the second teeth are meshingly engaged with some of the first teeth;
a cam connected to the second locking plate;
a bushing ring disposed between the cam and the first locking plate; and
a plurality of lubricant members attached to the cam, wherein the cam, the bushing ring, and two of the plurality of lubricant members cooperate to form a pocket that moves as the cam rotates relative to the bushing ring, and wherein the pocket is at least partially disposed between the two of the plurality of lubricant members.

17. The recliner heart of claim 16, wherein the plurality of lubricant members are made of a resiliently compressible material.

18. The recliner heart of claim 16, wherein the pocket contains lubricant therein that lubricates the bushing ring as the cam rotates.

19. The recliner heart of claim 16, wherein the plurality of lubricant members are made of a felt material that is saturated with lubricant.

20. The recliner heart of claim 16, wherein the plurality of lubricant members are made of a porous polymeric material.

* * * * *

UNITED STATES PATENT AND TRADEMARK OFFICE
CERTIFICATE OF CORRECTION

| | |
|---|---|
| PATENT NO. | : 11,845,367 B2 |
| APPLICATION NO. | : 16/842135 |
| DATED | : December 19, 2023 |
| INVENTOR(S) | : Ralph L. Schmitz et al. |

It is certified that error appears in the above-identified patent and that said Letters Patent is hereby corrected as shown below:

On the Title Page

Foreign Patent Documents:

Page 3, Column 2, Line number 9, delete "103298685" and insert --103298652--

Page 3, Column 2, Line number 43, delete "GA" and insert --CA--

In the Claims

Column 11, Lines 15-20, Claim 11, delete "members, the first wedge and the bushing ring cooperate to define a lubricant pocket and the lubricant pocket is enclosed between the pair of first lubricant members, the first wedge and an inside surface of the bushing ring," and insert --members movably contact an inside surface of the bushing ring,--

Column 11, Lines 23, Claim 11, delete "ring;" and insert --ring as the first wedge rotates;--

Signed and Sealed this
Twelfth Day of March, 2024

*Katherine Kelly Vidal*

Katherine Kelly Vidal
*Director of the United States Patent and Trademark Office*